(No Model.) 9 Sheets—Sheet 1.
E. B. BEECHER & J. P. WRIGHT.
MACHINE FOR MAKING BOXES.
No. 554,975. Patented Feb. 18, 1896.

Witnesses:
Inventors:
Ebenezer B. Beecher
and
Jacob P. Wright
by Harry R. Williams atty (No Model.) 9 Sheets—Sheet 3.

E. B. BEECHER & J. P. WRIGHT.
MACHINE FOR MAKING BOXES.

No. 554,975. Patented Feb. 18, 1896.

(No Model.) 9 Sheets—Sheet 4.
E. B. BEECHER & J. P. WRIGHT.
MACHINE FOR MAKING BOXES.

No. 554,975. Patented Feb. 18, 1896.

(No Model.) 9 Sheets—Sheet 5.
E. B. BEECHER & J. P. WRIGHT.
MACHINE FOR MAKING BOXES.

No. 554,975. Patented Feb. 18, 1896.

(No Model.) 9 Sheets—Sheet 7.
E. B. BEECHER & J. P. WRIGHT.
MACHINE FOR MAKING BOXES.
No. 554,975. Patented Feb. 18, 1896.

(No Model.) 9 Sheets—Sheet 8.

E. B. BEECHER & J. P. WRIGHT.
MACHINE FOR MAKING BOXES.

No. 554,975. Patented Feb. 18, 1896.

Witnesses:
C. E. Buckland.
J. B. Jenkins.

Inventors
Ebenezer B. Beecher
and
Jacob P. Wright
by
Harry R. Williams
atty

UNITED STATES PATENT OFFICE.

EBENEZER B. BEECHER, OF WESTVILLE, AND JACOB P. WRIGHT, OF NEW HAVEN, CONNECTICUT, ASSIGNORS TO THE DIAMOND MATCH COMPANY, OF CHICAGO, ILLINOIS.

MACHINE FOR MAKING BOXES.

SPECIFICATION forming part of Letters Patent No. 554,975, dated February 18, 1896.

Application filed July 7, 1893. Serial No. 479,863. (No model.)

*To all whom it may concern:*

Be it known that we, EBENEZER B. BEECHER, residing at Westville, and JACOB P. WRIGHT, residing at New Haven, in the county of New Haven and State of Connecticut, citizens of the United States, have invented certain new and useful Improvements in Machines for Making Boxes, of which the following is a specification.

The invention relates to the class of machines constructed to automatically receive a strip of paper, apply a proper quantity of glue to the strip and cut it into blanks, and fold the blanks and deposit them thus folded into the hollow links of an endless chain, which holds them until the glue hardens, when the machine discharges the completed boxes from the links.

The object of the invention is to provide a simple, cheap, and rapid machine which will perform the above operations in a sure, positive, and accurate manner, whereby most desirable boxes can be produced; and the invention resides in details of a machine having feeding, gluing, punching, cutting, folding, holding, and discharge mechanisms, as more particularly hereinafter described, and pointed out in the claims.

Referring to the accompanying drawings.

Held in suitable bearings at each end of the table or bed 1, that is supported on any common form of legs, and by bearings in the upright frame 2 on the top of the table, is the main driving-shaft 3, which has a driving-pulley 4. The paper or board 5, in a continuous strip or web of the proper width, is rolled on a shaft 6, that is supported beneath the table of the machine in any desirable manner.

Supported by a post 7 depending from the under side of the bed is a rod 8 or a laterally-extending bar, loosely mounted upon which is a guide-plate 9, along which the paper passes from the roll to the machine. This plate 9 has a flange 10 on one edge, and held loosely above the surface of the plate so as to rest upon the paper is a roller 11, this roller being placed somewhat obliquely with reference to the passage of the strip of paper, so as to guide it toward the flange along the edge of the plate in order that the paper may properly receive the glue or other adhesive material and pass into the machine correctly, and as this heavy roller is placed on one side of the pivotal support of the plate the other end is tipped upward and with a frictional pressure holds the paper closely against the under surface of the table to control its feeding into the machine, Figs. 2, 3, 4, 5, and 19.

Figures 3, 20, 21:
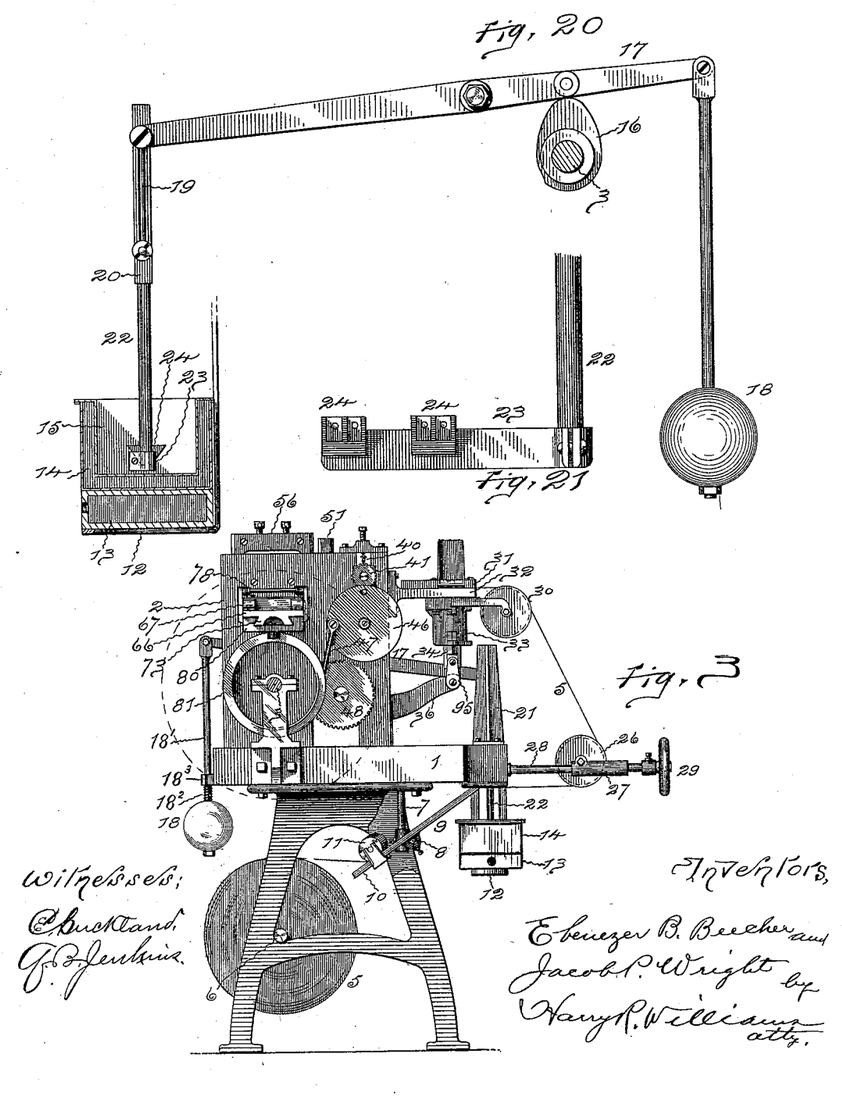
Fig. 3 is an elevation of the left end.
Fig. 20 is detail side elevation of the gluing mechanism.
Fig. 21 is a larger view of the gluing-fingers.
Figures 4, 19:
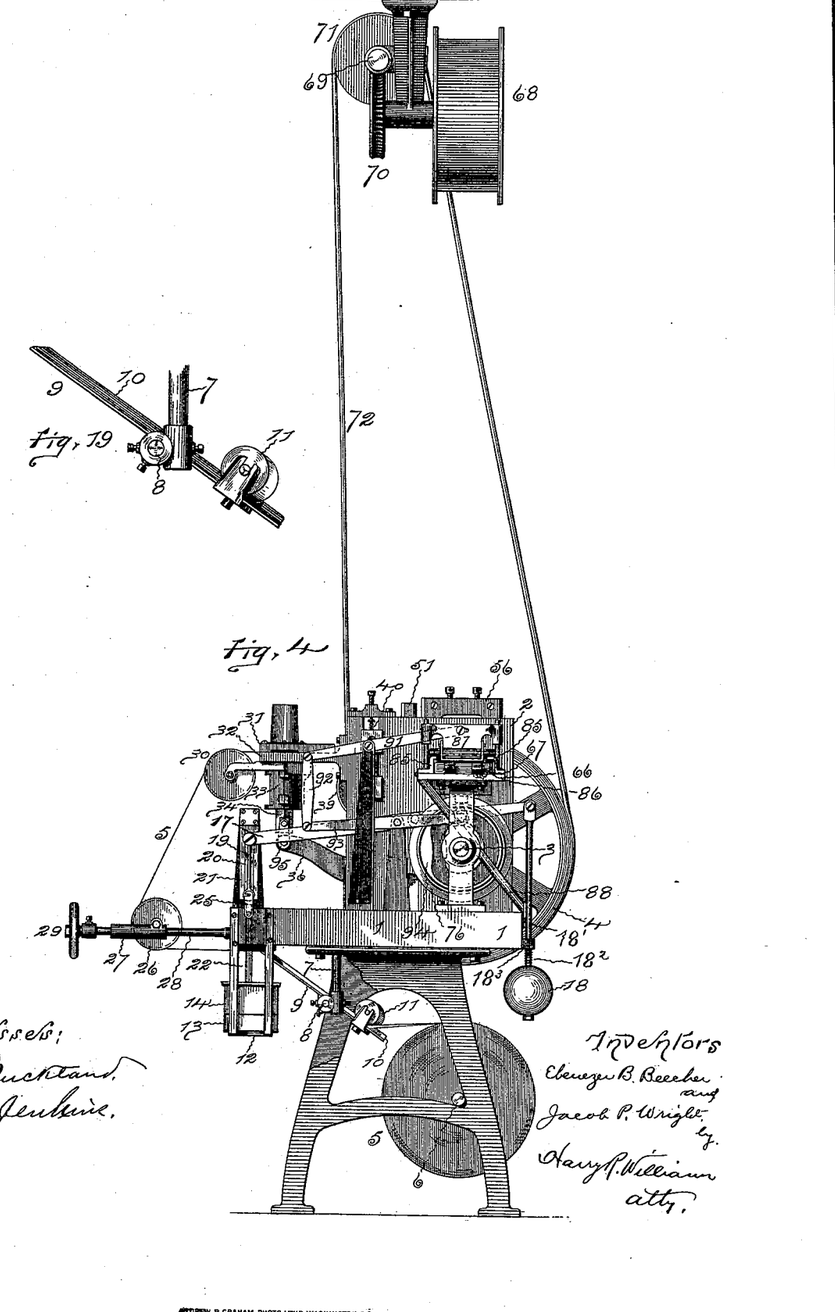
Fig. 4 is an elevation of the right end.
Fig. 19 is a detail side elevation of the paper-guide.
Figure 5:
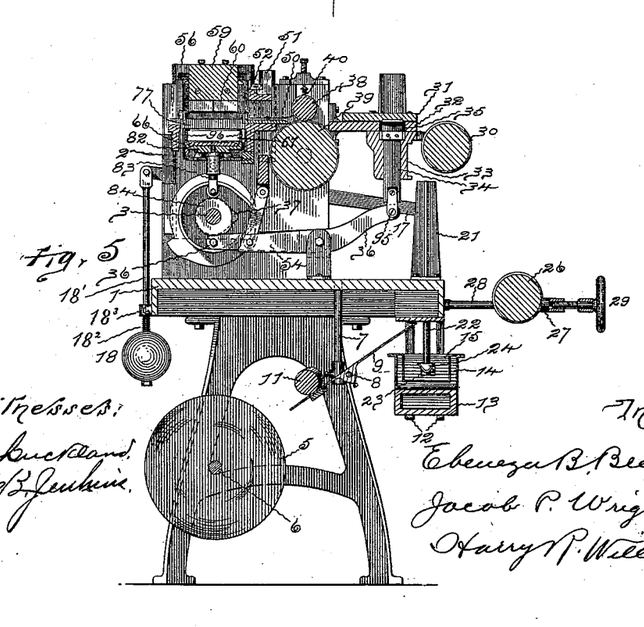
Fig. 5 is a transverse section on plane denoted by the broken line in Fig. 1.
Figures 6, 7, 22, 26:
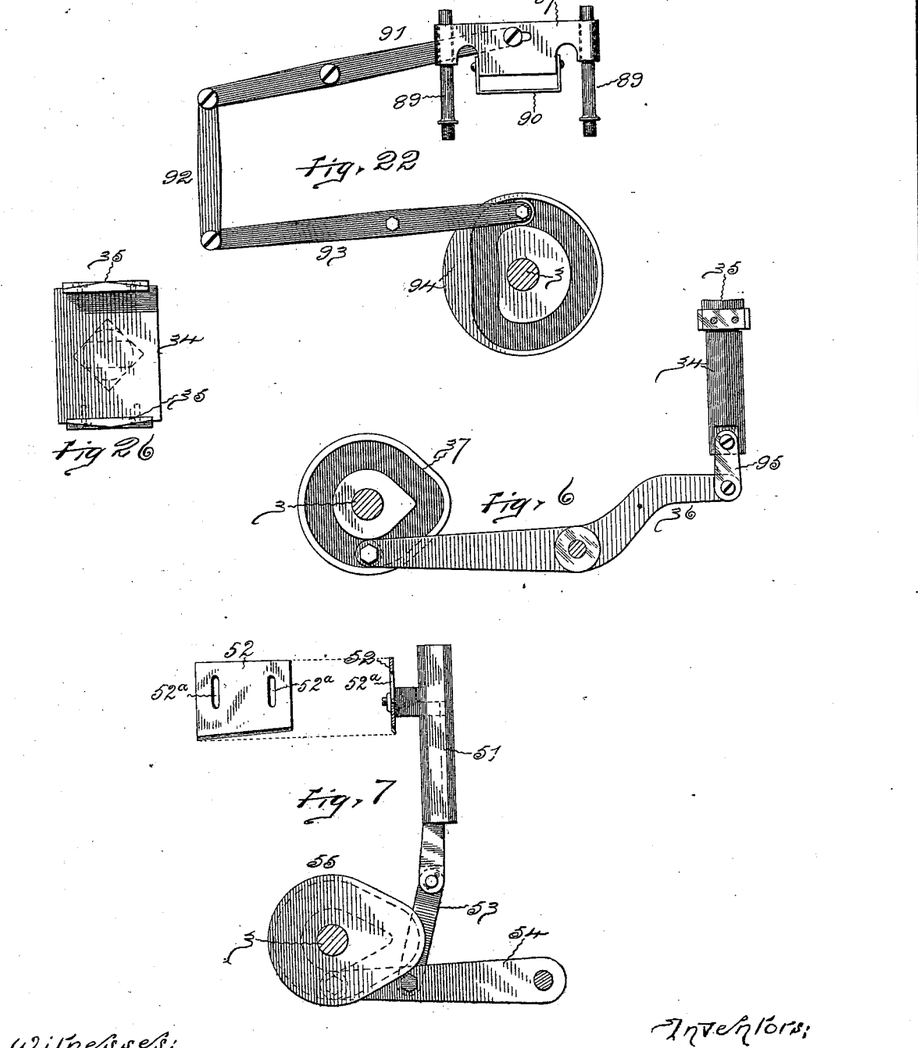
Fig. 6 is a detail view of the punching mechanism.
Fig. 7 is a detail view of the cutting mechanism.
Fig. 22 is a detail side elevation of the discharge mechanism.
Fig. 26 is an enlarged plan of the punch-head and punches.

As will be seen from Figs. 3, 4, and 5, the pivotal point of the plate is so arranged with reference to the under face of the table that such plate, when in position with its upper end pressing the paper against the table, stands at an angle to a direct line between the source of supply of the paper and the point where the latter is pressed against the table. As shown, the pivotal point of the plate is below such line, so that the paper from the roll or source of supply travels first at an angle to said line to and under the roller 11, and then at a less angle up along the plate 10 to the upper end of the latter, where it reaches the under face of the table. With this construction the weight of roller 11 will, by causing the pivoted plate 9 to press the paper against the table, so as to put the paper under friction, prevent the paper from becoming loose as it passes on to the feeding devices which draw it along.

Should the tension on the paper rise above a certain point, the roller 11 and the plate 9 will by the pressure of the paper be moved to carry the upper end of the plate away from the table to diminish the friction on the paper at that point.

Supported by a bent arm 12, secured to the edge of the bed, is a box 13, that is connected with any suitable supply of steam or other heated fluid whereby the liquid in the tank 14, which it supports, may be kept warm to keep liquid the glue that is in the receptacle 15, which the tank holds, Figs. 3, 4, 5, and 20.

Outside of the upright frame on top of the bed of the machine the main shaft bears a cam 16, and in contact with the face of this cam is a roller secured to a lever 17, that is pivoted to the side of the frame. The rear end of this lever is provided with a counterbalancing-weight 18, while the opposite end extends to the front and is connected by means of a link 19 with a slide 20, that is free to reciprocate vertically in a hollow post 21. Fastened to the slide 20 is a rod 22, clamped to which, so that it may be easily adjusted vertically, is a bar 23, provided with fingers 24. When the main shaft rotates, the cam 16 oscillates the lever 17, which reciprocates the slide and rod with the bar, causing the fingers to descend into the liquid glue in the receptacle and rise at the proper time against the surface of the paper that passes above, the cam being so timed that the fingers make an upward movement, then stop before rising farther, allowing the surplus glue to drip off in order to prevent too much glue being applied to the strip, Figs. 4, 20, and 21. A little latch 25 may, if desired, be pivoted to the side of the bed, so as to engage a pin projecting from the slide to hold it down and prevent the glue mechanism from operating.

In order that proper actuation of the glue-applying devices may be made sure of, even while the machine is operating very rapidly, we provide the rod 18', which connects the weight 18 with the lever 17, with a spiral spring $18^2$, which, when the rod-carrying end of such lever is raised to the limit of its upward movement by the cam 16, will be compressed between the weight 18 and a bearing $18^3$ on the table or bed 1, through which the rod 18' passes. The spring, thus compressed, acts to assist the weight 18 in holding the lever forced down, with its roller bearing on cam 16, and acts to start such lever down quickly just as soon as the highest part of the cam passes such roller. This spring is made of such length as to be fully expanded and to cease to act after it has thus started the lever down and aided in moving it a short distance. The weight alone then continues the movement of the lever, which brings the glue-applying fingers against the paper. We have found by actual practice that this spring-starting device, in combination with the weighted lever, is of great advantage in insuring an exact following of the cam-surface by the roller on the lever, however fast the machine may operate.

As the pasteboard strip has been found to be liable to considerable variations in thickness, due to irregularities and imperfections in manufacture, and also to differences in the amount of moisture absorbed by it from the atmosphere, we have found it necessary, in order to make sure always of that equality and uniformity in the pressure of the glue-fingers upon the strip, which is required to secure uniform and regular application of the lines of glue deposited by the glue-fingers, to use a weighted actuated lever, but, while the weight acts to always secure the same amount of pressure of the fingers upon the pasteboard strip, whatever the variations in thickness of the latter may be, we have found that when the cam 16 is rotated rapidly the desired quick downward starting of the lever 17, as soon as the highest part of the cam passes the roller on the latter, cannot be obtained by the use of the weight alone, unless such weight be made heavier than is desirable for bringing the glue-fingers up against the strip.

The spring $18^2$, acting as it does only during the starting and first part of the downward movement of the weighted end of the lever, causes the lever to respond quickly to the change in diameter of the cam-face and then leaves the weight to do its work alone.

After passing from the gluing-fingers the paper travels around a roll 26, that is adjustably supported on ways projecting from the front of the bed. This roll is preferably borne on screw-points held by a frame 27, which slides on the rods 28, that form the ways, a hand-wheel and screw 29 being provided to move the frame with this roller in and out, and so regulate the distance the paper has to travel between the glue mechanism and the punch, creasers and cutters, that the glue will be deposited on the strip in the exact localities to properly fasten the corners of the box, Figs. 1, 3, and 4.

From the roll 26 the paper passes over the roll 30 and through a mortise made between the plates 31 and 32 that are attached to the front edge of the upright frame. Secured to the under side of the bottom plate 32 is a hollow post 33, in which is a block 34, to the upper end or head of which are removably attached punch-plates with the punches 35, that pass upward through openings in the plate 32 at the proper time and cut from the paper the superfluous material, so that the corners of the box may be folded nicely. The block 34 is connected by means of a link 95 with one end of a lever 36, that is pivoted to the table, the opposite end of the lever being provided with an antifriction-roller that travels in a cam-groove properly cut in the cam-disk 37, borne by the main shaft between the walls of the upright frame, Figs. 2, 5, 6, and 26.

In movable blocks held in vertical slots cut in the walls of the upright frame are the journals of the feed-rolls 38 and 39, Fig. 5. The lower of these rolls is usually made the larger and is provided with grooves to receive the scoring-knives, while the upper or smaller roll, the bearings of which are held down by adjustable springs 40, is usually provided with scoring-knives that crease the paper as it passes between the rolls after being punched. The upper roll-shaft has a pinion 41 meshing with a gear 42 on the lower shaft, and fast to this lower shaft is a disk 43 with three ratchet-teeth. Loosely mounted on the same shaft is a disk 44, fast to which is a pawl 45, while adjustably clamped to the outside of this disk is a similar disk 46. This latter disk 46 is connected by means of a rod 47 with a gear 48 that meshes with the gear 49, that is mounted on the main shaft at the side of the upright frame, Figs. 1. 2, 3, 10, and 11. The rotation of these gears causes an oscillation of the disks, so that the pawl engages the ratchet-teeth and causes the rolls to feed the desired length of paper at the proper time, the localities at which the scoring-knives shall score being readily determined and the paper adjusted by the adjustment of the two movable disks, one of which bears the pawl, while the other bears the connecting-rod, which disks are connected together by bolts passing through slots.

Figures 1, 27, 28:
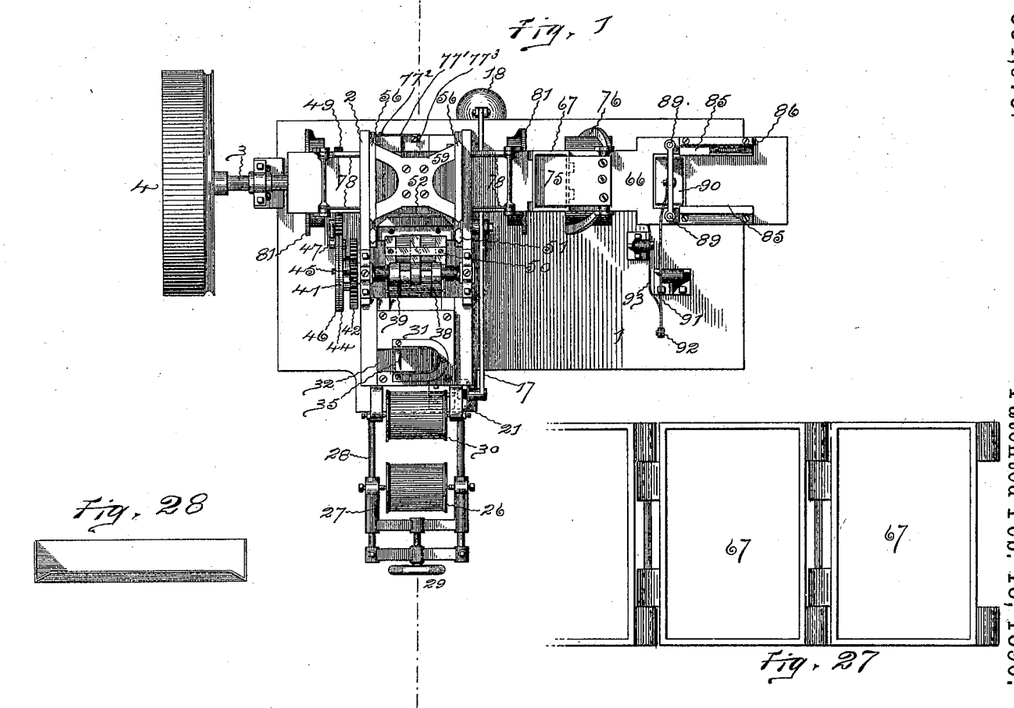
Figure 1 is a plan of the machine.
Fig. 27 is a plan of a few links of the chain.
Fig. 28 is a section of a box formed in the machine.

Back of the feed-rolls in the guideway for the paper are a series of springs 50, which hold the paper while it is being cut, Figs. 1 and 5. Back of these springs, held in vertical runways on the inside of the upright frame, is a rectangular head 51, the edges of which are so formed that the head will reciprocate freely in the ways, and to the upper back edge of this head above the path of the paper to a projecting ledge is adjustably fastened a cutter-blade or knife 52 by screws that pass through vertically-elongated openings or slots 52$^a$ in the knife. The lower edge of the head is connected by means of a link 53 with the lever 54, that has an antifriction-roller running in a groove in a cam-disk 55 on the main shaft, Figs. 5 and 7. This cam is so timed that at the proper moment the knife is made to descend and separate from the strip the correct amount of paper for a single box.

Figures 2, 23:
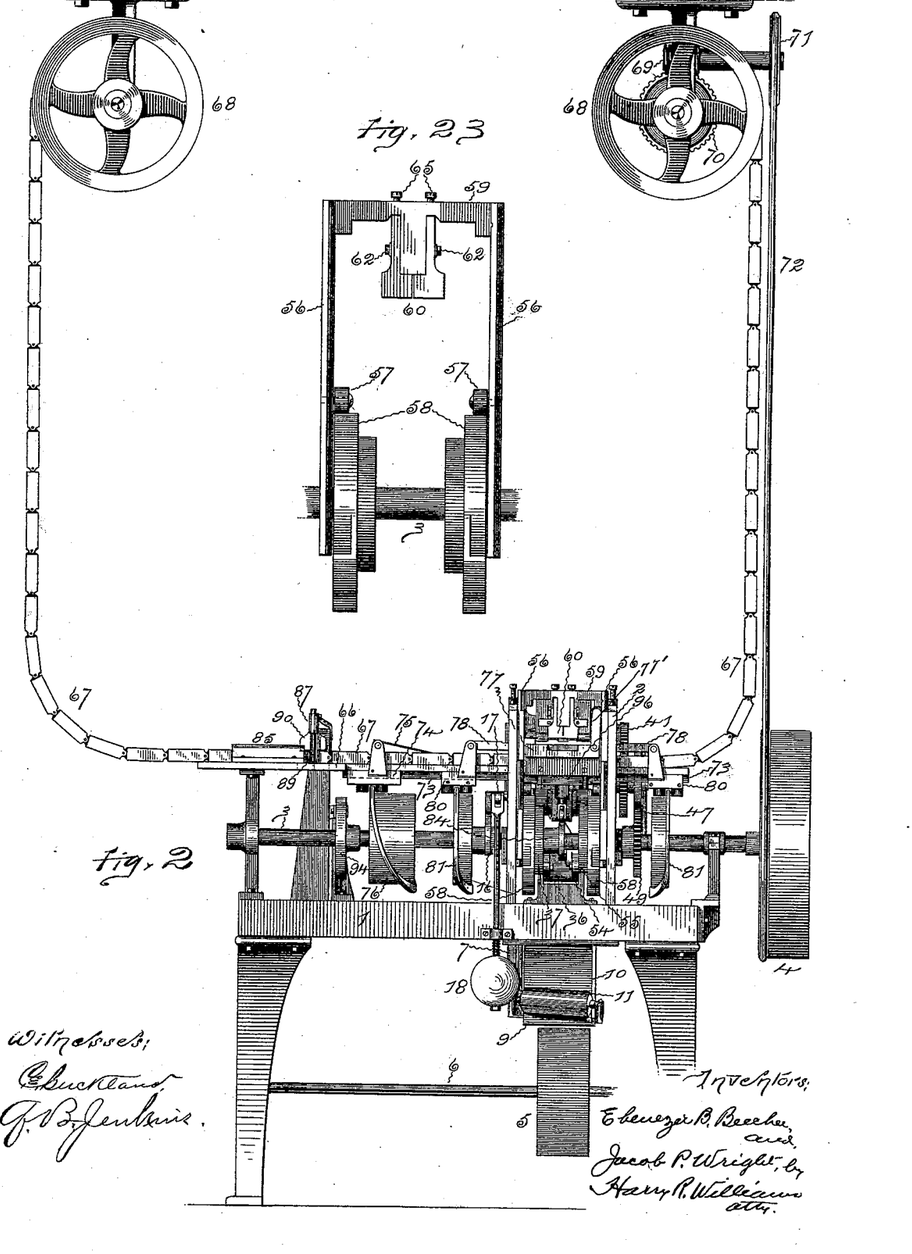
Fig. 2 is a rear elevation.
Fig. 23 is a detail elevation of the former and its operating mechanism.
Figures 12, 13, 14, 15, 16, 17, 18:
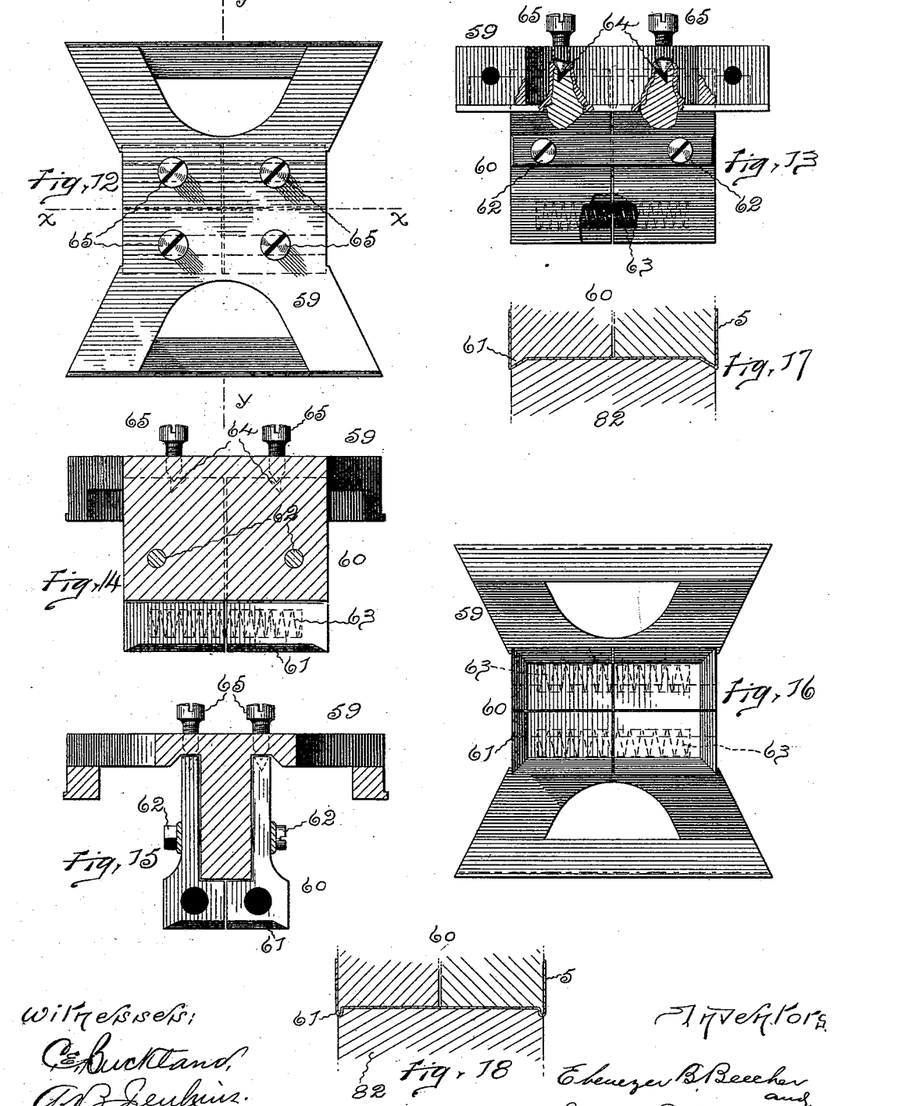
Fig. 12 is a plan of the former-head.
Fig. 13 is a side view of the same with portions broken away to illustrate the construction.
Fig. 14 is a vertical section on line X X.
Fig. 15 is a vertical section on line Y Y.
Fig. 16 is a bottom view of the head.
Fig. 17 is a detail sectional view of a portion of the former and its follower or the platform with a box between them.
Fig. 18 is a similar view of a former and platform having differently-shaped working faces.

Secured in vertical ways on the inside of the upright frame at the rear of the machine, so they may be freely reciprocated, are plates 56 that have rollers 57, which rest upon the edges of the cams 58, that are on the main shaft by the insides of the upright frame, Figs. 1, 2, and 23. The upper ends of these plates hold between them a head 59, which supports a former 60 with a rectangular face that is recessed or provided with a raised rim 61 around its edge. This former 60 is made in four sections, which are held to the head by means of the pivotal bolts 62. The sections adjacent are thrust apart by means of spiral springs 63, and the upper end of each of the sections has an angular notch or recess 64, into which projects a set-screw 65, that passes through the top of the head. These angular recesses are so shaped and arranged that the screwing in or out of the set-screws slightly oscillates the sections against the pressure of the springs and adjusts the total area or expanse of the under surface of the former and regulates the tension with which the springs thrust the sections apart, Figs. 12, 13, 14, 15, and 16. By means of this arrangement the sections of the former are thrust outward toward the ends of the boxes being formed so as to press the glued portions together with a firm pressure, which, however, is so yielding that it will give and allow for variation in thickness of the paper. The shape of the raised rim upon the edge of this former is not material. It may be wide, as shown in Fig. 17, or narrow, as shown in Fig. 18, the object being to crease the bottom edges of the box or raise the bottom above the lower edge of the sides.

Supported by the upright frame longitudinally above the driving-shaft is a chain-table or runway 66, along which moves the open rectangular links 67 of the endless chain. The openings in the links of this chain are of just the size and shape of the exterior of the box to be formed by the machine, and after receiving the boxes as they are formed and forced into them by the former the chain passes from the machine up over pulleys 68, that are supported above the machine, one of these pulleys being given a regular motion by means of a worm 69 and gear 70, driven by a small pulley 71 connected by a belt 72 with the main driving-pulley.

Movable on a dovetailed guide 73 on the under side of the chain-table at the right of the frame is a slide 74, that pivotally supports a plate 75. On the under side of the slide are antifriction-rollers that are in contact with the cam 76 on the driving-shaft. The plate 75 is adapted to make contact with the edges of the links of the chain, and when the cam drives the slide forward the chain is advanced the correct distance and a link fed beneath the former, Figs. 1 and 2.

Supported by the chain-table between the walls of the upright frame is a plate 77, that has an opening through it, the surface of the edges of which on two sides being on a level with the path of the paper as it passes from the feed-rollers, while the surfaces of the other two sides are lower, Fig. 5.

In order to insure that the cut blank shall have the proper position with relation to the opening in the plate 77, a stop-piece 77' can be used, which, as shown in Figs. 1 and 2, consists of a plate hinged at 77² to plate 77, and has an abutment 77³ to engage the outer end of the blank, as the latter is fed into position over plate 77. When the stop-piece is swung down, so as to have its abutment 77³ in position to act as a stop for the end of the blank, such abutment rests upon the top of the plate 77. When the stop-piece is swung up, as shown in Fig. 2, it will stand to one side, so as to leave a clear passage, through which the paper strip can be drawn or fed out as desired.

Figure 8:
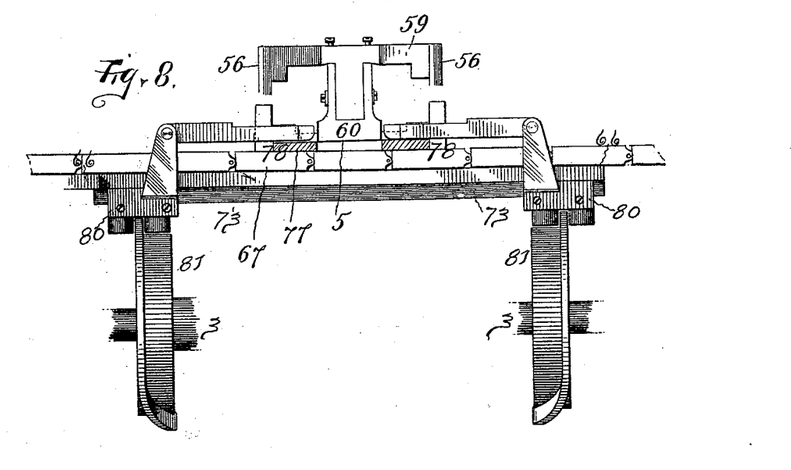
Fig. 8 is a detail side elevation of the mechanism which folds the corners of the boxes.
Figure 9:
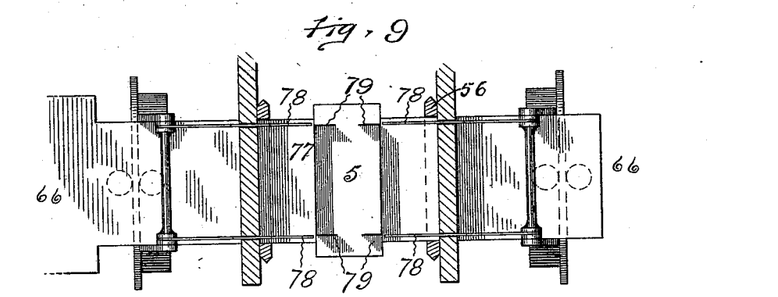
Fig. 9 is a plan of the same.
Figure 10:
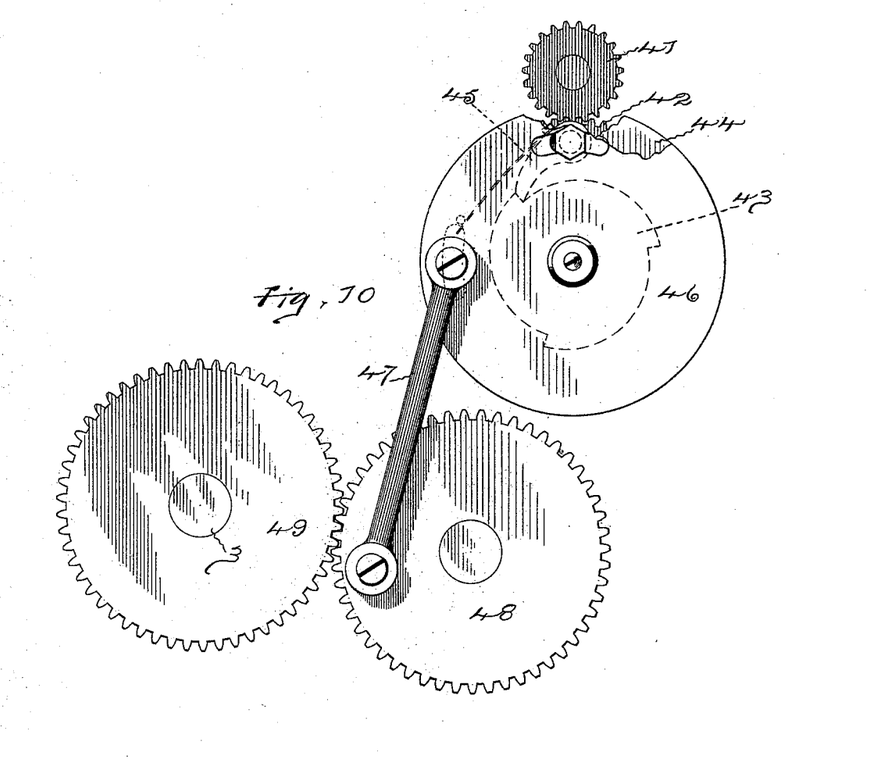
Fig. 10 is a side elevation, on a large scale, showing the driving mechanism for the feed-rolls.
Figure 11:
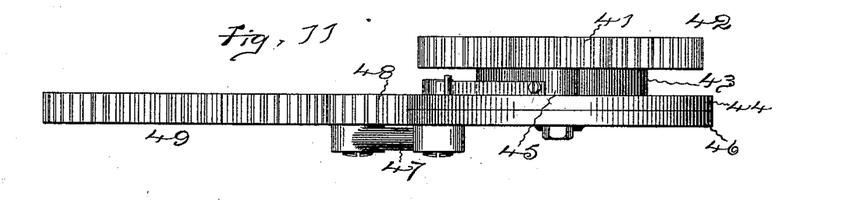
Fig. 11 is a plan of the same.
Figure 24:
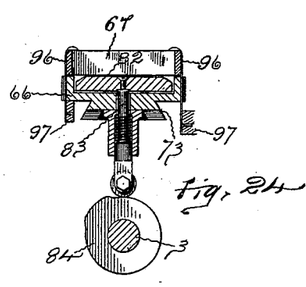
Fig. 24 is a detail elevation of the bottom platform.
Figure 25:
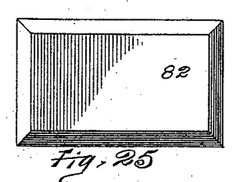
Fig. 25 is an enlarged plan of the bottom platform.

After the blank which has been cut from the strip is fed upon the surface plate 77 over the opening, the former descends a short distance so as to force the blank down into the opening through the plate. As the opening through the plate is just as wide as the width of the bottom of the box the side edges of the blank are folded up to form the sides of the box. At this time four fingers 78 are moved toward the bent-up sides of the blank and fold in the ends 79, as in Fig. 9, where, however, the fingers are shown drawn back after the folding. These fingers 78 are held by slides 80 that are movable along a dovetailed way beneath the chain-table on each side of the upright frame, the slides having antifriction-rollers that are in contact with the cams 81 on the main shaft, so that the slides move and cause the fingers to fold in the edges of the upright sides of the blank at the proper time and then withdraw out of the way, Figs. 8 and 9. As the former descends still farther and forces the blank through the opening in the plate into the opening in the link below to fold up the ends of the blank and complete the box, the fingers are withdrawn. After the folded blank has been carried down through the plate 77 into one of the links 67, the former 60 is lifted by the action of the moving cam already described, the box being cleared from it by means of the spring-fingers 96, and remaining in the link until the glue has hardened. These spring-fingers 96, which are removably secured to block 97, fastened to the under side of the chain-table adjacent to the opening through it, project up alongside of the path of the links and have on their upper ends heads with abrupt under sides adapted to project inward over the upper edges of a link, (see Fig. 24,) into which a box is forced, and engage the upper edges of the box, so as to hold it down in the link and strip it from former 60 as the latter rises. The upper sides of these heads are rounded or beveled off, so that they will be forced backward or outward by the engagement of the folded blank of box as the latter is forced down through plate 77 into the link. After the passage of the box down into the link, the heads on the fingers 96 will snap in over the tops of the box sides, to act as indicated above.

The surface of the chain-table below the former is cut away and in the opening thus formed is placed a plate or platform 82, having a beveled or centrally-projecting upper surface that is complementary with the recessed under surface of the former into which it is adapted to be moved. This plate is secured to the top of a post 83, that has a vertical movement, and is provided with an antifriction-roller which rests upon the surface of the cam 84 on the driving-shaft, Figs. 1, 5, and 24. When the former has forced the blank into the link, the cam 84 lifts the plate upward, so as to press inward or recess the bottom of the box, as shown in Figs. 17 and 28. The cam 84 may be cut so as to raise the plate or platform 82 upward through the opening in the runway to meet the former and make the recess in the bottom of the box before the former has descended to fold up the sides, so there will be plenty of stock to make this depression in the bottom without stretching or tearing the paper, as might occur in attempting to make a deep re-entrant bottom after the sides had been folded.

The chain is fed with an intermittent motion by means of a slide on the chain-table of the machine just the correct distance to leave a link beneath the former, and the chain is also moved above the machine by the pulleys and belt with a regular motion, there being slack enough in the chain to permit this intermittent motion through the machine and the regular motion above the machine. As the chain returns to the chain-table the upper edges of the links pass beneath the inturned upper edges of guide-flanges 85 85. At one side of the way, so formed, there is a spring-pressed plate 86, which engages the links of the chain and presses them over against the inner face of the opposite guide-flange, Figs. 1 and 4. As the links pass from these flanges a cross-head 87 is made to descend and force the box from the link beneath it, and the completed box slides down the chute 88 out of the machine, Fig. 4. This cross-head has bearings at its ends which slide upon upright posts 89, and is provided with a broadened plate 90, that forces the box from the link. Attached to the cross-head is a lever 91, that is connected by means of a link 92 with the end of a lever 93, that has an antifriction-roller running in a properly-timed cam-groove in the disk 94 on the main shaft, near the right end, Figs. 2 and 22.

As the continuous strip of paper passes into the machine the glue mechanism deposits the proper amount of glue in the correct localities on its surface. The strip then passes above the punches and the excess material is removed, so that the corners may be accurately folded. Then, after passing the feed-rollers, the proper length for a single box is severed from the strip by the reciprocation of the knife. This piece is then partially depressed into an opening which folds up the two sides of the box, the fingers then coming forward and folding in the ends of the bent-up sides, after which the former still further descends, so as to force the blank through the opening that bends up the ends. This deposits the folded blank in a link. The bottom plate in the meantime comes up and recesses the bottom of the box and returns, so as to free the link which carries the box around over the pulleys until the adhesive substance has hardened. Then the discharging mechanism forces the box from the link.

The machine is simple, cheap, compact and efficient. It is perfectly adjustable and automatic in all its operations, and a box is formed which is very stiff, and has square and true corners on account of its re-entrant bottom, which box more easily slides into a tube or receives a cover when it is formed in this manner on account of the regularity and stiffness of the sides.

We claim as our invention—

1. In a machine for forming boxes in combination with mechanism for feeding a strip of paper, a surface on a suitable support a pivoted guide-plate to support and guide the strip, and yielding means for causing the plate to stand at an angle to a line between the source of supply of the strip and the point where the strip reaches the surface of the support and to press the strip against the surface above the edge of the plate, substantially as and for the purpose specified.

2. In a machine for forming boxes, the combination of a suitable support for a roll of paper, mechanism for drawing the paper therefrom, a pivoted guide-plate over which it passes from the roll a surface adjacent to the plate, and a roller journaled on said plate to one side of its pivot to cause the plate on the opposite side of its pivot to press the paper against the adjacent surface, substantially as and for the purpose described.

3. In a machine for forming boxes, in combination with the feeding mechanism for the strip of paper, a guide-plate for the strip pivotally supported on a suitable support and bearing a roller placed obliquely above the path of the strip along the plate, substantially as specified.

4. In a machine for forming boxes, in combination with the feeding mechanism for the strip of paper, the pivoted guide-plate for the strip, having the guiding-flange, and the roller, to engage the strip passing along the plate, having its axis set at an angle to the line of the guiding-flange, and supported in bearings, so as to be movable toward and from the plate, substantially as and for the purpose specified.

5. In a machine for forming boxes, in combination with the glue-applying device, a lever connected therewith, so as to actuate the same, a cam engaging a suitable bearing on the lever, a weight acting upon the lever in opposition to the cam, and the starting-spring, the pressure of which is brought to bear upon the lever, while the latter is at or near the limit of its movement by the cam, substantially as and for the purpose specified.

6. In a machine for forming boxes in combination with suitable support for the material to be used, a source of supply of glue, a glue-applying device moving between such source of supply and the surface to be glued, a lever connected with such device, a weight acting upon the lever to move and bring the glue-applying device against the surface to be glued, a cam acting upon a bearing on the lever, to cause the latter to move the applying device against the stress of the weight, and a starting-spring compressed when the lever is moved to the limit of its movement by the cam and exerting its power on the lever in opposition to the cam, substantially as and for the purpose described.

7. In a machine for forming boxes, in combination with the glue-applying device, and a suitable support for the material to be glued, the lever connected with such device, a cam engaging a bearing on the lever, to actuate the latter to move the glue-applying device away from the surface to be glued, a weight hung upon the lever, to move it in opposition to the cam, a bearing on the frame and a spring interposed between such bearing and the weight, adapted to be compressed between the bearing and weight, only as the latter approaches the limit of its upward movement during the actuation of the lever by the cam, substantially as and for the purpose shown.

8. In a machine for forming boxes, in combination with blank-folding devices, the former, upon which the blank is folded, having its under side provided with a recess having its edges parallel with and running down to the side and end walls of the former, a platform having a raised portion with its edges parallel to those of the former-recess, whereby, as such raised portion of the platform passes up within the recess in the former, the bottom of the blank folded on the former will be forced up within the recess, and an acute bend will be made where the bottom joins the side and end portions of the folded blank, and means for causing the former and platform to move relatively, to carry the raised part of the platform up into and from the recess in the former, substantially as and for the purpose set forth.

9. In a machine for forming boxes in combination with blank-folding devices, the former upon which the blank is folded, having its under face rectangular and provided with a rectangular recess, the side and ends of which are parallel with and extend down close to the side and end walls of the former, a platform having a raised rectangular portion, to enter the recess in the former, corresponding in size with the recess, so as to make an acute bend in the blank, on the lines where the side and end portions join the bottom part thereof, and means for causing relative movement of the plunger and platform, substantially as and for the purpose described.

10. In a machine for making boxes in combination with the folding devices, the rectangular former upon which the blank is folded, having in its under side a rectangular recess with its sides extending downward and outward at an angle to bring its edges close to the edges of the former-bottom, the platform having a raised portion corresponding in shape with such recess, and of such size as to press the blank on the former closely against the sides of the recess, and means for causing relative movement of former and platform, to bring the raised portion of the platform into and out of the former-recess, substantially as and for the purpose specified.

11. In a former for box-forming machines, in combination with the head, the blank-engaging part made in sections, pivoted to the head, the springs for forcing the lower parts of such sections apart, and adjustable stop devices to regulate the amount of separation of the sections by the spring, substantially as and for the purpose specified.

12. In a former, for use in box-forming machines, in combination with the head, the blank-engaging part made in four sections pivoted to the head, and springs forcing the sections apart to move outward away from each other the outer working faces, which are to press the overlapping parts of the folded blank, substantially as and for the purpose specified.

13. A former for a box-folding machine, consisting of a head with forming-sections pivoted thereto, springs for thrusting the working faces of the sections from each other, and screws turning against inclined faces for forcing together the working faces of the sections, substantially as specified.

EBENEZER B. BEECHER.
JACOB P. WRIGHT.

Witnesses:
H. R. WILLIAMS,
F. K. CASWELL.